US006636224B1

(12) United States Patent
Blythe et al.

(10) Patent No.: US 6,636,224 B1
(45) Date of Patent: Oct. 21, 2003

(54) METHOD, SYSTEM, AND COMPUTER PROGRAM PRODUCT FOR OVERLAPPING GRAPHICS DATA COLLECTION AND TRANSMISSION USING A SINGLE PROCESSOR

(75) Inventors: David Blythe, San Carlos, CA (US); Sharon Clay, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/386,378

(22) Filed: Aug. 31, 1999

(51) Int. Cl.[7] .................................................. G09G 5/36
(52) U.S. Cl. ..................... 345/545; 345/502; 345/536
(58) Field of Search ................................. 345/419, 502, 345/503, 504, 505, 506, 536, 545

(56) References Cited

U.S. PATENT DOCUMENTS

| | | | | |
|---|---|---|---|---|
| 4,855,937 A | | 8/1989 | Heartz ........................ 364/521 |
| 5,287,436 A | | 2/1994 | Fischer et al. .............. 395/119 |
| 5,646,640 A | * | 7/1997 | Gove ............................ 345/8 |
| 5,719,598 A | * | 2/1998 | Latham ....................... 345/419 |
| 5,727,192 A | | 3/1998 | Baldwin ...................... 395/522 |
| 5,761,401 A | | 6/1998 | Kobayashi et al. ......... 395/130 |
| 5,767,846 A | * | 6/1998 | Nakamura et al. ....... 715/500.1 |
| 5,777,621 A | | 7/1998 | Schneider et al. .......... 345/428 |
| 5,886,701 A | | 3/1999 | Chauvin et al. ............ 345/418 |

OTHER PUBLICATIONS

Copy of International Search Report issued Mar. 23, 2001 for PCT/US00/40786, 3 pages.
AGP Tutorial: Chapter 4—AGP Memory Mapping (visited Dec. 27, 1999) <http://developer.in–tel.com/technology/agp/ tutorial/chapt_4.htm>, 2 pages.
AGP Tutorial: Chapter 5—A Summary of AGP's Benefits (visited Dec. 27, 1999) <http://developer.intel.com/technology/agp/ tutorial/chapt_5.htm>, 1 page.
AGP Tutorial: Chapter 6—What This Means for Software Developers (visited Dec. 27, 1999) <http://developer.intel.com/technology/agp/ tutorial/chapt_6.html>, 3 pages.
Rohlf, J. and Helman, J., "IRIS Performer: A High Performance Multiprocessing Toolkit for Real–Time 3D Graphics," *Computer Graphics Proceedings, Annual Conference Series, 1994, ACM SIGGRAPH*, pp. 381–394.
Accelerated Graphics Port/AGP Benefits (visited Feb. 24, 1999) <http://developer.intel.com/technology/agp/benefits/index.htm>, 2 pages.
AGP Technology Tutorial (visited Dec. 27, 1999) <http:developer.intel.com/technology/agp/ tutorial/index.htm>, 1 page.
AGP Tutorial: Chapter 1—3–D Graphics on Current Generation PCs (visited Dec. 27, 1999) <http://developer.intel.com/technology/agp tutorial/chapt_1.htm>, 3 pages.
AGP Tutorial: Chapter 2—3D Graphics on Next Generation PCs (visited Dec. 27, 1999) <http://developer.intel.com/technology/agp/ tutorial/chapt_2.htm>, 2 pages.
AGP Tutorial: Chapter 3—A Closer Look at AGP Data Transfers (visited Dec. 27, 1999) <http://developer.intel.com/technology/agp/ tutorial/chapt_3.htm>, 1 page.

* cited by examiner

*Primary Examiner*—Matthew C. Bella
*Assistant Examiner*—Mackly Monestime
(74) *Attorney, Agent, or Firm*—Woodcock Washburn LLP (57) ABSTRACT

A method, system, and computer program product sends scene data to a geometry engine, wherein a processor generates scene data for a frame in accordance with an application program, and writes the scene data to a first memory location, known hereinafter as an intermediate buffer. Scene data for the next frame is then generated and written to a second intermediate buffer, while a geometry engine reads and renders the scene data in the first intermediate buffer. Scene data for the following frame is then generated and written to the first intermediate buffer, while a geometry engine reads and renders the scene data in the second intermediate buffer. The process continues in this manner until the application program is finished executing.

31 Claims, 12 Drawing Sheets

METHOD, SYSTEM, AND COMPUTER PROGRAM PRODUCT FOR OVERLAPPING GRAPHICS DATA COLLECTION AND TRANSMISSION USING A SINGLE PROCESSOR

BACKGROUND OF THE INVENTION

1. Field of the Invention

The invention relates generally to computer graphics. In particular, the invention relates to the collection of graphics data and sending the data to graphics hardware.

2. Related Art

The production of computer graphics images comprises two fundamental stages. The first is the generation of data that specifies a frame or scene, known hereinafter as scene data. The second is the rendering of an image for display, based on the scene data, by graphics hardware. Some current computer graphics systems utilize one processor to handle the generation of scene data, and another processor to send the scene data to the graphics hardware. The two stages typically take place alternately and in serial. Scene data is generated by the first processor. The second processor then sends the scene data to the geometry engine, the first module in a graphics hardware suite. The first processor then generates data for the next scene, which the second processor then sends to the geometry engine. The process continues in serial fashion.

This architecture has a number of drawbacks. First, there is an inherent inefficiency in the serial operation of the two processors. Each experiences an idle period when the other processor is acting. During such idle time, available processing power is unused. Moreover, throughput is limited. A frame can only be received by the geometry engine after the completion of both the scene data generation stage and the data sending stage, in sequence. Moreover, two processors are required. This contributes to the expense and complexity of a graphics system.

Hence there is a need for graphics system architecture wherein the collective processes of scene data generation and transmission are improved with respect to efficiency and throughput. In addition, such an architecture should minimize the amount of computing power necessary.

SUMMARY OF THE INVENTION

The invention described herein comprises a method, system, and computer program product for sending scene data to a geometry engine. A processor generates scene data for a frame in accordance with an application program, and writes the scene data to a first memory location, known hereinafter as an intermediate buffer. Scene data for the next frame is then generated and written to a second intermediate buffer, while a geometry engine concurrently reads and renders the scene data in the first intermediate buffer. Scene data for the following frame is then generated and written to the first intermediate buffer, while a geometry engine reads and renders the scene data in the second intermediate buffer. The process continues in this manner until the application program is finished executing.

The invention has the feature of reading and rendering scene data while simultaneously generating additional scene data.

The invention has the additional feature of generating and rendering scene data in a pipeline architecture.

Because of the pipeline architecture, the invention has the advantage of relatively high throughput in the processing of scene data.

The invention has the further advantage of requiring only a single processor to both generate scene data and make the scene data available to a geometry engine.

Further features and advantages of the invention as well as the operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Contents

I. Overview
II. Terminology
III. System

A. General
B. Memory
C. Scene data structure
D. Multiple processors and scene generation
IV. Method
A. General
B. Generating and writing scene data to memory
C. Reading and rendering scene data
D. Multiple threads and context switching
V. Environment
VI. Conclusion

DETAILED DESCRIPTION OF THE PREFERRED EMBODIMENTS

I. Overview

Figure 1:
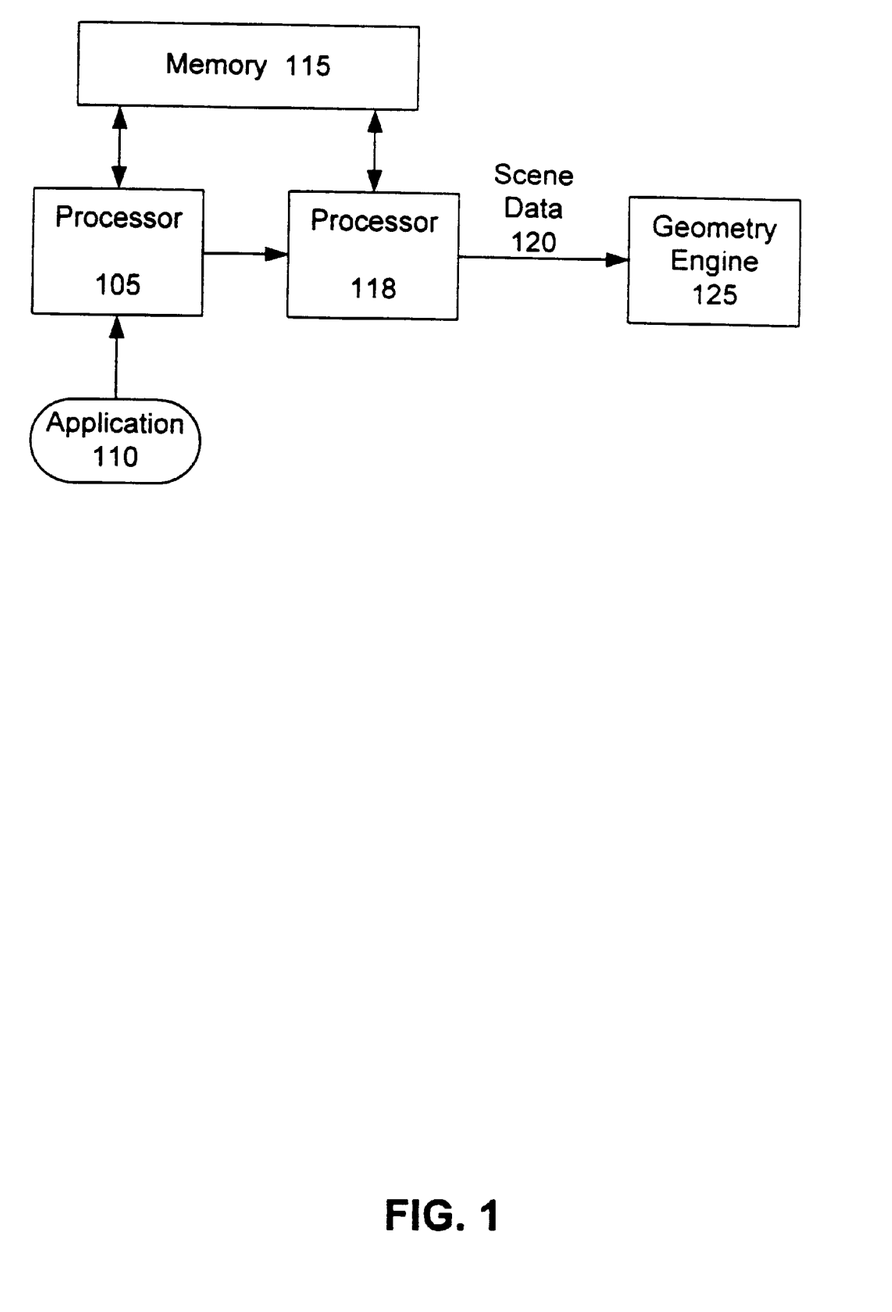
FIG. 1 is a block diagram illustrating the architecture of a computer graphics system, according to current art.

As described above, current computer graphics systems use a processor to generate scene data in accordance with an application program running on the processor. A second processor is commonly allocated for the purpose of relaying the generated scene data from the first processor to a geometry engine, where the process of transforming the scene data into a display image is begun. Such an architecture is illustrated in FIG. 1. A first processor 105 receives an application program 110. By executing application 110, processor 105 generates scene data for a frame. In so doing, processor 105 interacts as necessary with a memory unit 115. The scene data generated by processor 105 is then transferred to geometry engine 125 by a second processor 118. It is the responsibility of processor 118 to transfer scene data 120 from processor 105 to geometry engine 125.

Figure 2:
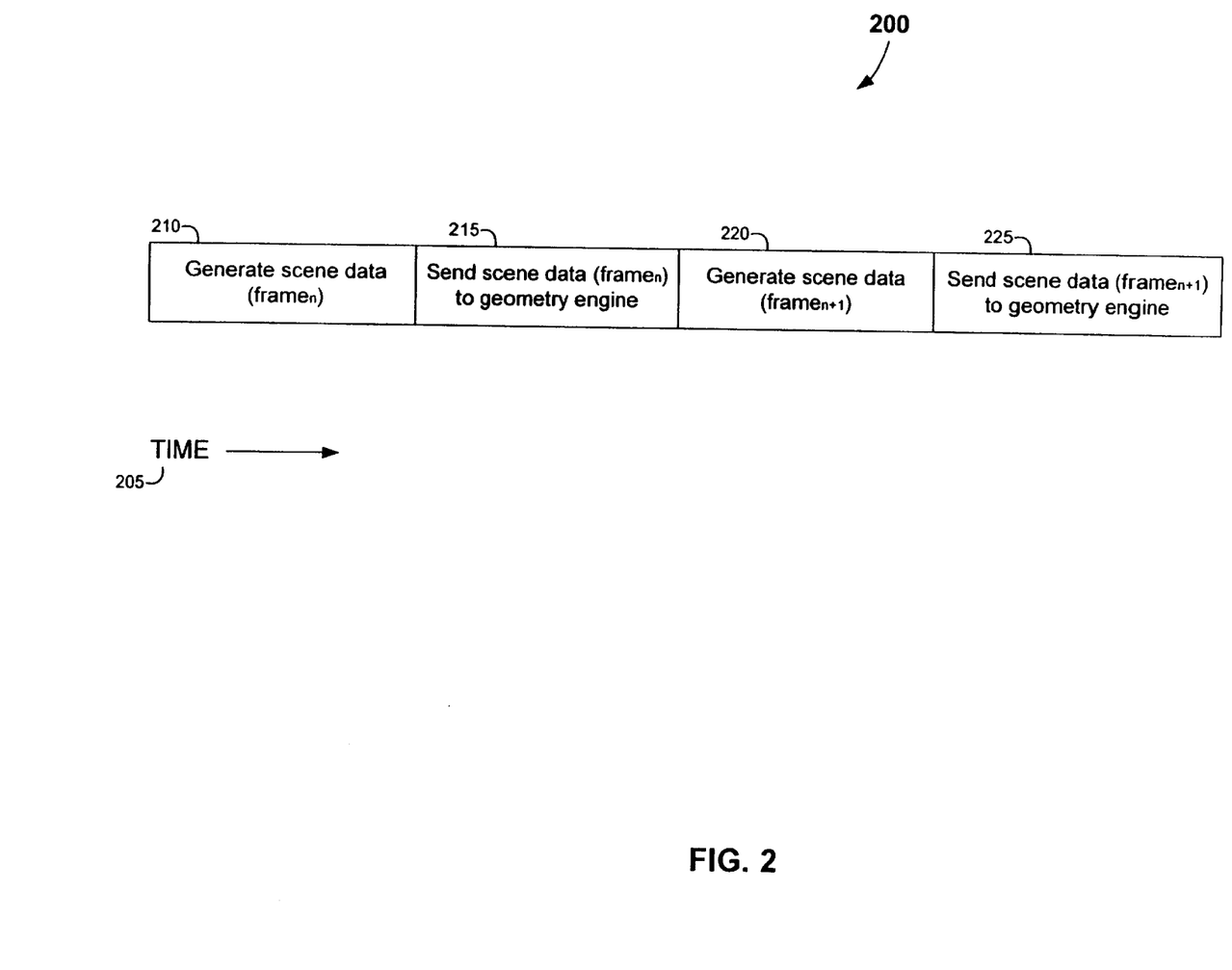
FIG. 2 is a timing diagram illustrating the sequence of events that results from a computer graphics system of the type illustrated in FIG. 1.

The sequence of events resulting from such an architecture is illustrated in FIG. 2. The events are illustrated as a function of time 205. In an event 210, a first processor generates scene data corresponding to a frame$_n$. In an event 215, a second processor sends the scene data of frame$_n$ to the geometry engine. In an event 220, the first processor generates scene data for the next frame, frame$_{n-1}$. In an event 225, the second processor sends the scene data pertaining to frame$_{n+1}$ to the geometry engine. The process continues in serial fashion. Each scene data generation event is followed in serial by an event wherein a second processor sends the scene data to a geometry engine. This process is repeated for each successive frame.

In the present invention, a second processor is unnecessary. A single processor generates scene data and transfers the scene data to a intermediate buffer in memory. The processor then issues instructions to the geometry engine to retrieve the scene data. In so doing, the processor sends to the geometry engine the address, in memory, of the intermediate buffer. The geometry engine then retrieves the scene data from the indicated address.

While the geometry engine is retrieving the scene data and performing the necessary rendering of the scene data, the processor is generating scene data for the next frame. When completed, the scene data for the next frame is sent by the processor to a second intermediate buffer. Once this transfer to memory is completed and the graphics hardware has finished rendering the scene data from the first intermediate buffer, the processor issues another read instruction to the geometry engine. The geometry engine proceeds to read the next segment of scene data from the second intermediate buffer location.

While the geometry engine does this, the processor generates scene data for a third frame, placing the scene data into the first memory location. The process continues with the scene data generation proceeding in parallel, concurrent with the scene data reading and rendering operations. Therefore, while the graphics hardware reads and renders a frame of scene data, the processor is generating scene data for the following frame. As a result, the collective processes of generating scene data and transferring the scene data to graphics hardware become more efficient. The collective processes are pipelined, and throughput is increased. Moreover, only one processor is used.

II. Terminology

The following section defines several terms that occur frequently throughout the application.

Application is used broadly herein to describe a series of instructions to be executed by a processor. In the context of computer graphics, the term refers to a series of instructions that, when executed, produce data that can be rendered to form an image, a portion of an image, or a series of images.

Frame refers to a segment of data that, when input to a rendering process, yields an image or a portion of an image.

Geometry engine refers to a hardware component that performs the first steps in a rendering process. These steps can comprise geometric calculations, lighting calculations, perspective operations, and color processing of pixels. The output of a geometry engine comprises data that can be rasterized.

Intermediate buffer refers to a location in a memory medium where scene data (defined below) can be stored immediately after generation, according to an embodiment of the invention. An intermediate buffer serves as a temporary location for scene data storage, pending subsequent access of the data by a geometry engine.

Scene data refers to data generated by the execution of an application by a processor. Scene data is input to a geometry engine to begin the rendering process, and is eventually rendered into an image.

III. System

A. General

Figure 3:
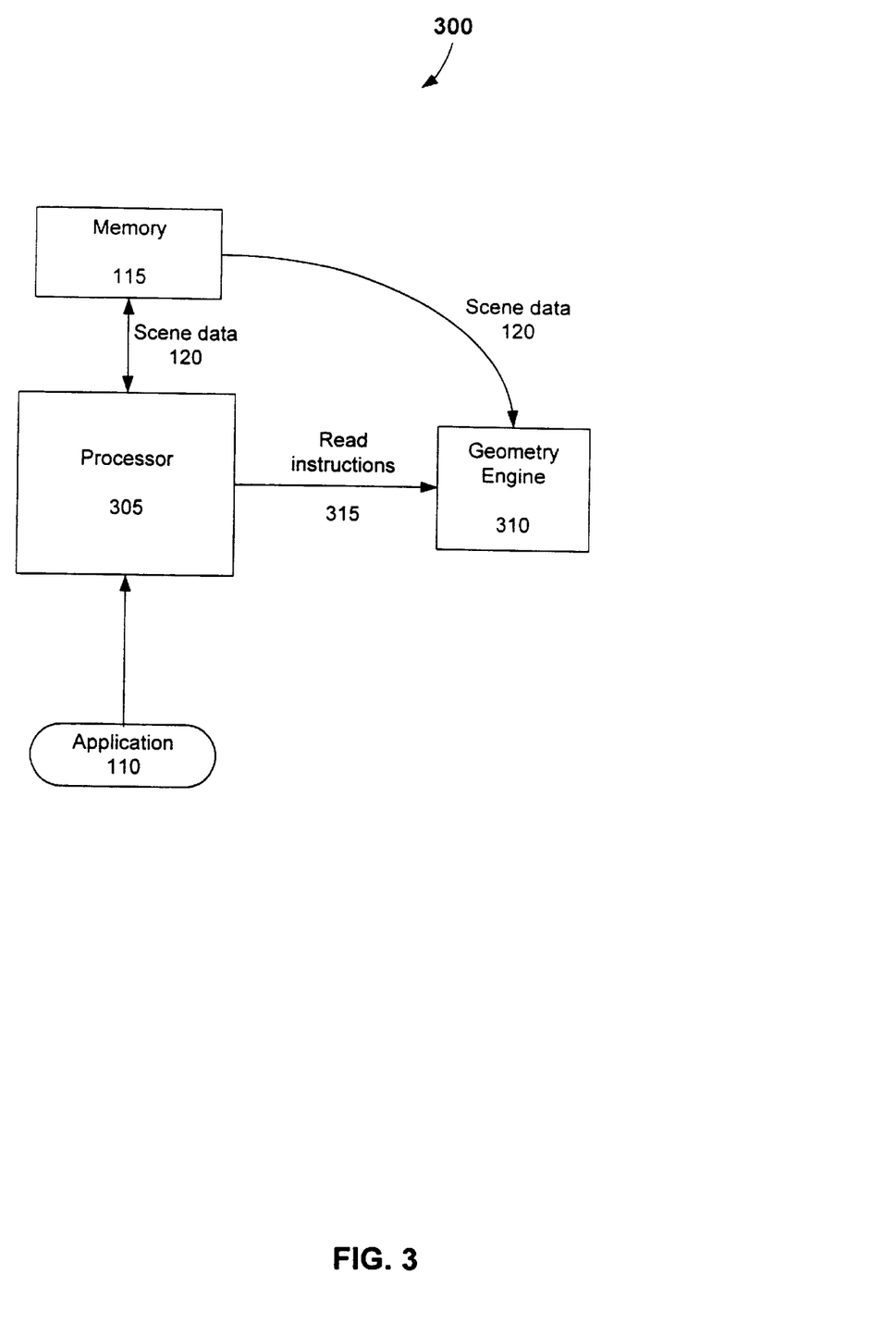
FIG. 3 is a block diagram illustrating the architecture of a computer graphics system, according to an embodiment of the invention.

An embodiment of the present invention is illustrated in FIG. 3. A processor 305 is shown loading an application 110. The application 110 may be written in any of several languages suitable for programming graphics hardware. One such language is OpenGL®. In executing application 110, processor 305 generates scene data 120. In an embodiment of the invention, this is done one scene, or frame, at a time. Scene data 120 contains descriptions of objects and features that will ultimately comprise a displayed frame. If OpenGL® is used, scene data 120 comprises display lists. Once generated, scene data 120 associated with a given frame is transferred to a memory module 115. In particular, scene data 120 for the frame is written to one of a plurality of specific locations in memory 115, known as intermediate buffers.

Processor 305 issues instructions 315 to a geometry engine 310. Geometry engine 310 is responsible for beginning the rendering process, and performs such tasks as the initial manipulation of the geometric entities that will eventually form a scene. Instructions 315 tell the geometry engine 310 to read scene data 120 from memory 115. Moreover, instructions 315 tell the geometry engine 310 the address of the intermediate buffer in which scene data 120 can be found. The geometry engine 310 then retrieves scene data 120 from the specified intermediate buffer in memory 115.

B. Memory

Figure 4:
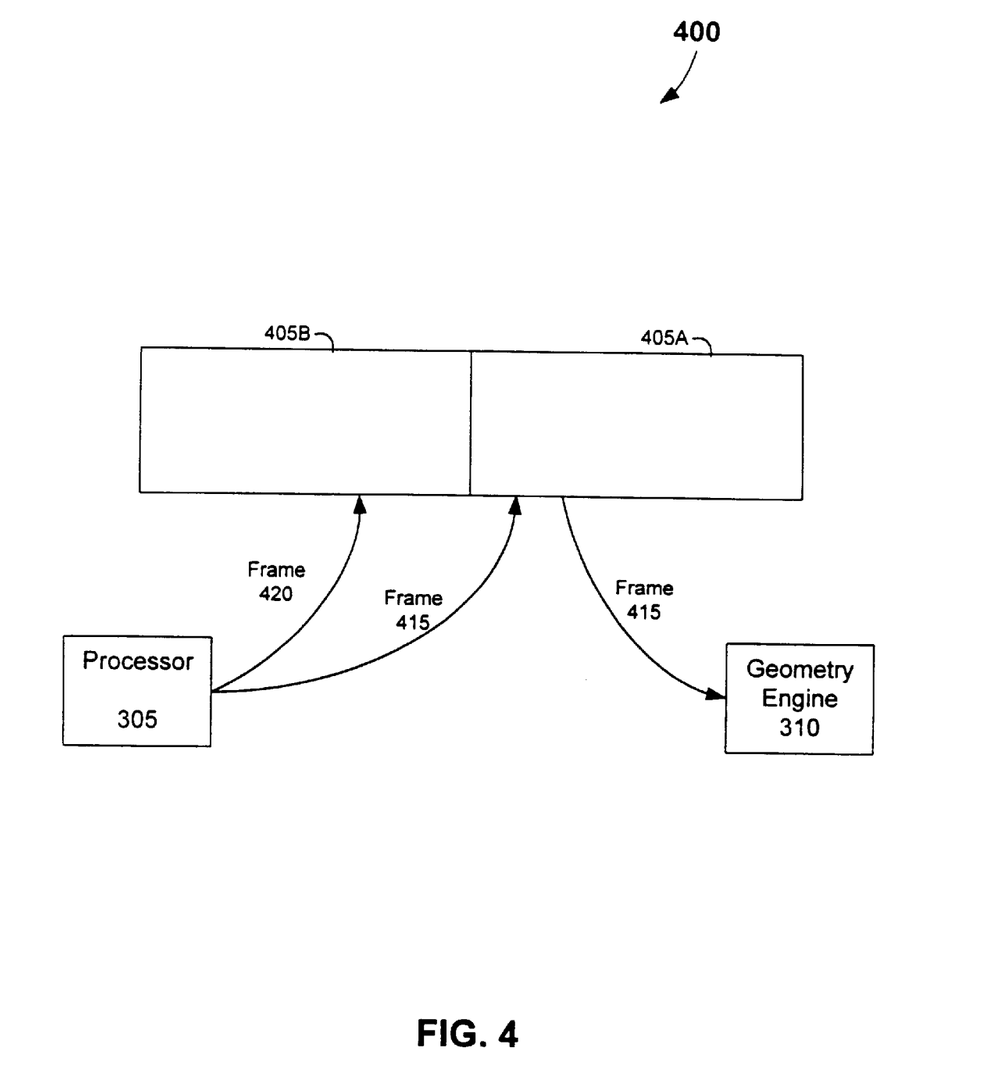
FIG. 4 is a block diagram illustrating the interaction between a processor, a geometry engine, and intermediate buffers, according to an embodiment of the invention.

The structure of memory 115, according to an embodiment of the invention, is illustrated in greater detail in FIG. 4. Memory 115 comprises two intermediate buffers 405A and 405B. Processor 305, which generates scene data on a frame-by-frame basis, first generates scene data associated with a frame 415. Processor 305 sends the scene data associated with frame 415 to intermediate buffer 405A. Geometry engine 310 can then access the scene data associated with frame 415 from intermediate buffer 405A when told to do so by processor 305. While intermediate buffer 405A is being accessed and its scene data rendered, processor 305 generates scene data associated with a next frame 420. Processor 305 writes the scene data associated with frame 420 into intermediate buffer 405B.

In a next step (not shown), geometry engine 310 reads the scene data associated with frame 420 from intermediate buffer 405B. While doing so, processor 305 generates scene data for the next frame and writes the scene data to intermediate buffer 405A. The process continues in this fashion. Processor 305 therefore writes alternately to intermediate buffers 405A and 405B. Geometry engine 310 reads scene data from whichever intermediate buffer is not currently being addressed by processor 305. This effects a pipelined data flow process which will be described in greater detail below.

Note that in an alternative embodiment of the invention, more than two intermediate buffers may be used. If, for example, the processor finishes writing to a first intermediate buffer before the geometry engine has finished reading fron the second intermediate buffer, then the processor will have nowhere to which it can write the scene data for the next frame. To handle such conditions, three or more intermediate buffers may be used to support the pipeline process of the invention.

C. Scene data structure

Figure 5A:
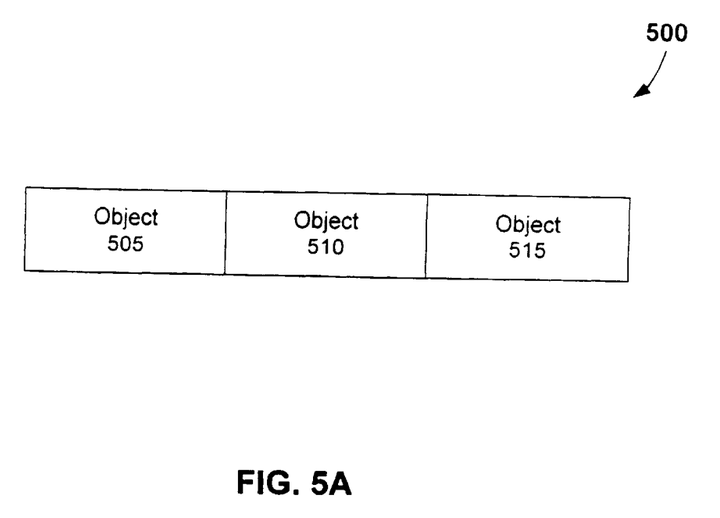
FIG. 5A is a block diagram illustrating the flat organization of scene data as contained in an intermediate buffer, according to an embodiment of the invention.
Figure 5B:
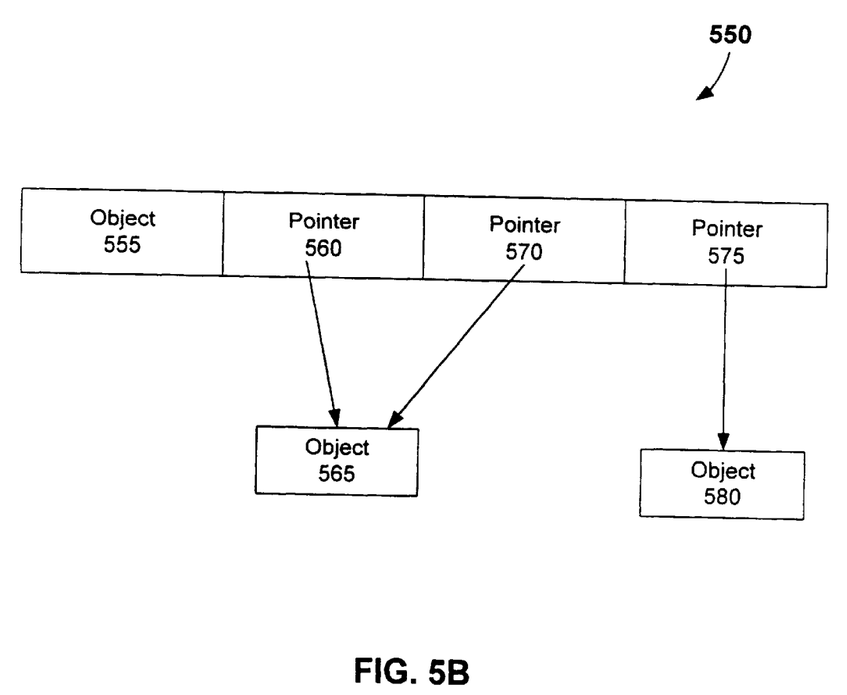
FIG. 5B is a block diagram illustrating the hierarchical organization of scene data as contained in an intermediate buffer and in other memory locations, according to an embodiment of the invention.

Possible formats for scene data, according to an embodiment of the invention, are described in FIGS. 5A and 5B. In FIG. 5A, scene data for a frame is illustrated. The scene data comprises a plurality of object descriptions. The first description defines an object 505. Likewise, the second and third object descriptions define objects 510 and 515, respectively. The data in each object description comprises information sufficient for the graphics system, including the geometry engine, to begin rendering that portion of the frame corresponding to the object. Scene data consisting of a series of explicit object descriptions is said to have a flat structure.

In contrast, FIG. 5B illustrates an exemplary hierarchical structure. Here, the scene data 550 comprises descriptions of objects, such as object 555. But in a hierarchical structure, the scene data also comprises pointers, such as pointers 560, 570, and 575, which refer to object descriptions elsewhere in memory. In the example shown, pointer 560 serves as a reference to an object described elsewhere in memory, object 565. Likewise, pointer 570 also references object 565. Pointer 575 references a different object 580. Descriptions of objects 565 and object 580 are not explicitly included in the scene data written by the processor to the intermediate buffer. Scene data 550 written to the intermediate buffer therefore comprises object 555, and pointers 560, 570, and 575. Scene data 550 is equivalent to scene data comprising explicit descriptions of objects 555, 565, 565 (again), and 580. Because a pointer requires less memory space than an explicit object description, scene data in a hierarchical format is a more compact representation of a scene.

D. Multiple processors and scene generation

Figure 6:
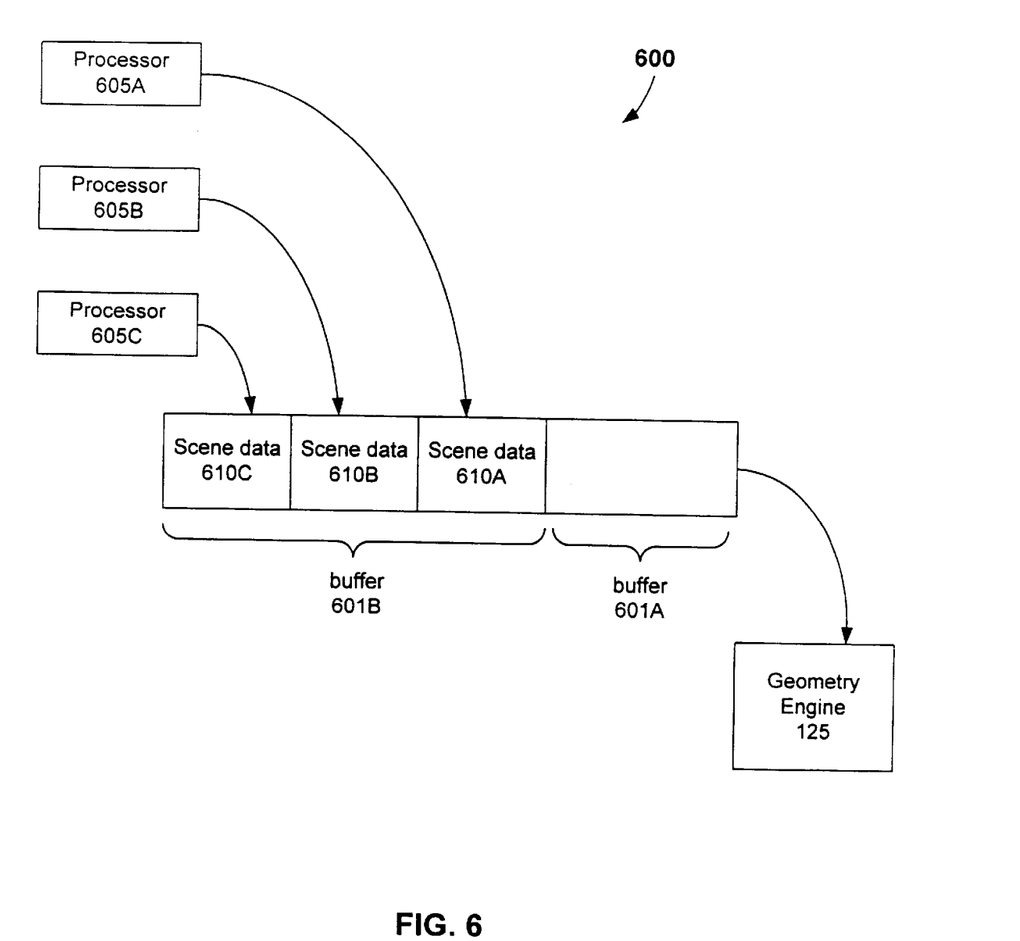
FIG. 6 is a block diagram illustrating the interaction between multiple processors, a geometry engine, and intermediate buffers, according to an embodiment of the invention.

In an alternative embodiment of the invention, a plurality of processors execute their own respective applications. In such an embodiment, all the processors write their own scene data to a single intermediate buffer. The resulting plurality of scene data blocks is interpreted collectively as a single frame. An exemplary embodiment is illustrated in FIG. 6. Here, a plurality of processors are shown, processors 605A, 605B, and 605C. Each processor writes its own scene data to an intermediate buffer 601B. Scene data 610A is provided by processor 605A, scene data 610B is provided by processor 605B, and scene data 610C is provided by processor 605C. These blocks of scene data may be either flat or hierarchical, as illustrated in FIGS. 5A and 5B.

In the embodiment of FIG. 6, a pipelined sequence of operations takes place, similar to the sequence illustrated in FIG. 4. While processors 605A through 605C are generating and writing the scene data to intermediate buffer 601B, geometry engine 125 is reading the contents of intermediate buffer 601A, which contains scene data written in the previous step by processors 605A through 605C. After the scene data in intermediate buffer 601A has been rendered, and after processors 605A through 605C have completed writing their scene data to intermediate buffer 601B, geometry engine 125 will read the scene data in intermediate buffer 601B. Meanwhile, processors 605A through 605C will generate scene data for the next frame. This scene data will be written to intermediate buffer 601A. Operations continue in this manner until all scene data has been generated and processed.

Note that because each processor in FIG. 6 is executing its own respective application program, there will be several distinct contexts represented in the frame described in intermediate buffer 601B. When the data in intermediate buffer 601B is read and rendered by the graphics hardware, multiple contexts must therefore be handled. As a result, geometry engine 125 must be able to perform the necessary context switching when it finishes rendering one block of scene data and begins another. This will be described in greater detail below.

IV. Method

A. General

The method of the invention provides for parallel execution of two sets of processes. While graphics hardware reads and renders the scene data generated by a processor for a given frame, the processor generates scene data for the next frame and writes it to memory. In this manner, the generation of scene data is performed during the reading and rendering of previously generated scene data. This pipeline approach allows for greater throughput in a graphics system, and provides for efficient usage of resources.

Figure 7:
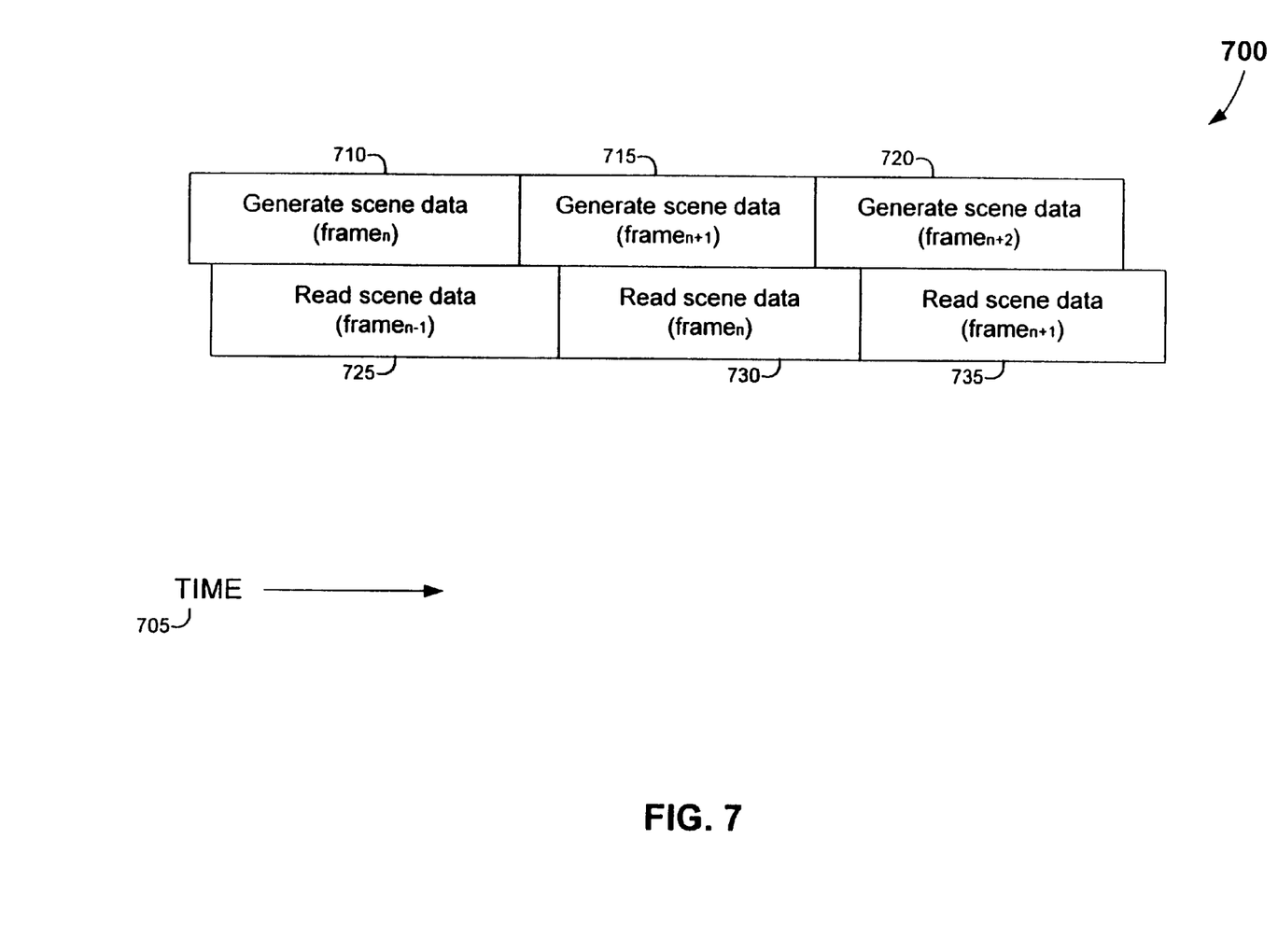
FIG. 7 is a timing diagram illustrating the temporal relationship between the scene data generation by a processor and the reading and rendering of scene data by graphics hardware, according to an embodiment of the invention.

A timeline of these events is shown in FIG. 7. The events are shown as a function of time 705. In an event 710, a processor generates scene data associated with a frame, and writes it to an intermediate buffer in memory. In an event 715, a processor generates and writes scene data associated with a $frame_{n-1}$. In an event 720, the processor generates and writes scene data associated with a $frame_{n+2}$. In parallel with scene data generation events 710 through 720, scene data is also being read from memory and rendered by graphics hardware. While, in event 710, the processor is generating and writing scene data associated with $frame_n$, the geometry engine is also acting. At this point, in an event 725, the geometry engine is reading scene data associated with $frame_{n-1}$ from an intermediate buffer in memory. Likewise, while the processor is generating and writing scene data associated with $frame_{n+1}$, the graphics hardware is reading and rendering scene data that had previously been generated for $frame_n$ in an event 730. Likewise, the scene data generated in event 715 is read and rendered by the graphics hardware in an event 735. The latter event takes place while the processor is generating scene data associated with the next frame, $frame_{n+2}$, in event 720.

Figure 8:
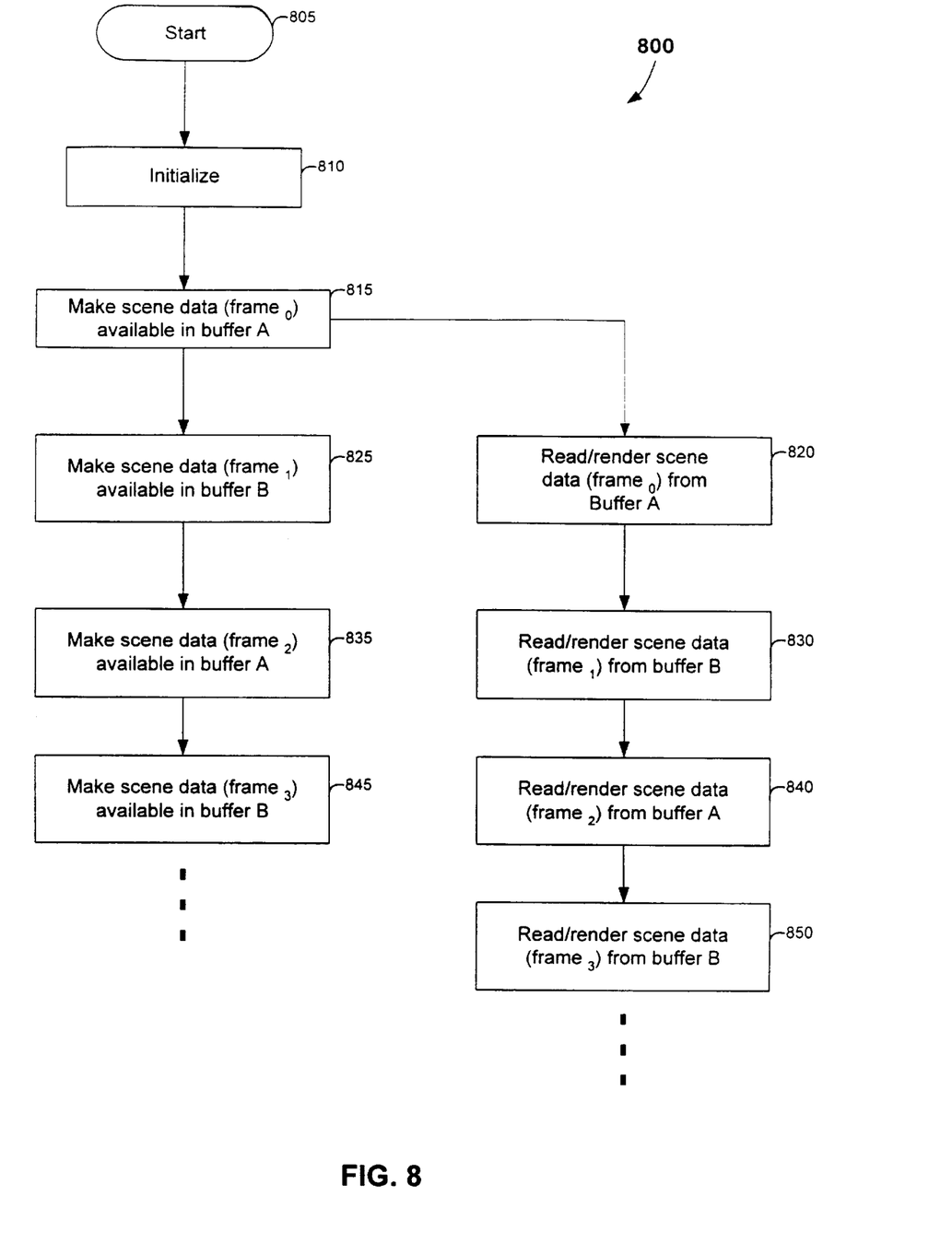
FIG. 8 is a flowchart showing the overall operation of an embodiment of the invention.

The steps of the process, according to an embodiment of the invention, are illustrated in greater detail in FIG. 8. The process begins with a step 805. In a step 810, any flags or indices which are used in the process are set to appropriate initial values. As will be described below, such flags may be used for signalling the completion of various tasks. In a step 815, scene data for a first frame, $frame_0$, is made available in a first intermediate buffer, denoted in FIG. 8 as buffer A. In this step, a processor generates scene data and writes the scene data to buffer A in memory.

After step 815, two events happen in an approximately contemporaneous way. In a step 820, the scene data that had just been written to buffer A is read from that intermediate buffer by the geometry engine and rendered by the graphics hardware. Meanwhile, in a step 825, the processor generates scene data associated with a next frame, $frame_1$, and writes it to a second intermediate buffer (identified in FIG. 8 as buffer B).

Once step 825 is completed, and once the graphics hardware has finished rendering the scene data from buffer A, a step 830 takes place. In this step, the scene data associated with $frame_1$ is read from buffer B by the geometry engine and rendered by the graphics hardware. This is the scene data that was made available in step 825. Meanwhile, in a step 835, the processor generates scene data associated with a next frame, $frame_2$. In step 835, the processor also writes this scene data to intermediate buffer A.

In a step 840, the scene data associated with $frame_2$ is read from buffer A by the geometry engine and rendered by the graphics hardware. Meanwhile, in a step 845, the processor generates scene data associated with the next frame, $frame_3$. The processor makes this scene data available in buffer B.

In a step 850, the scene data associated with $frame_3$ is read from buffer B by the geometry engine and rendered by the graphics hardware. The process continues in parallel, pipeline fashion until the application has completed execution in the processor.

B. Generating and writing scene data to memory

Figure 9:
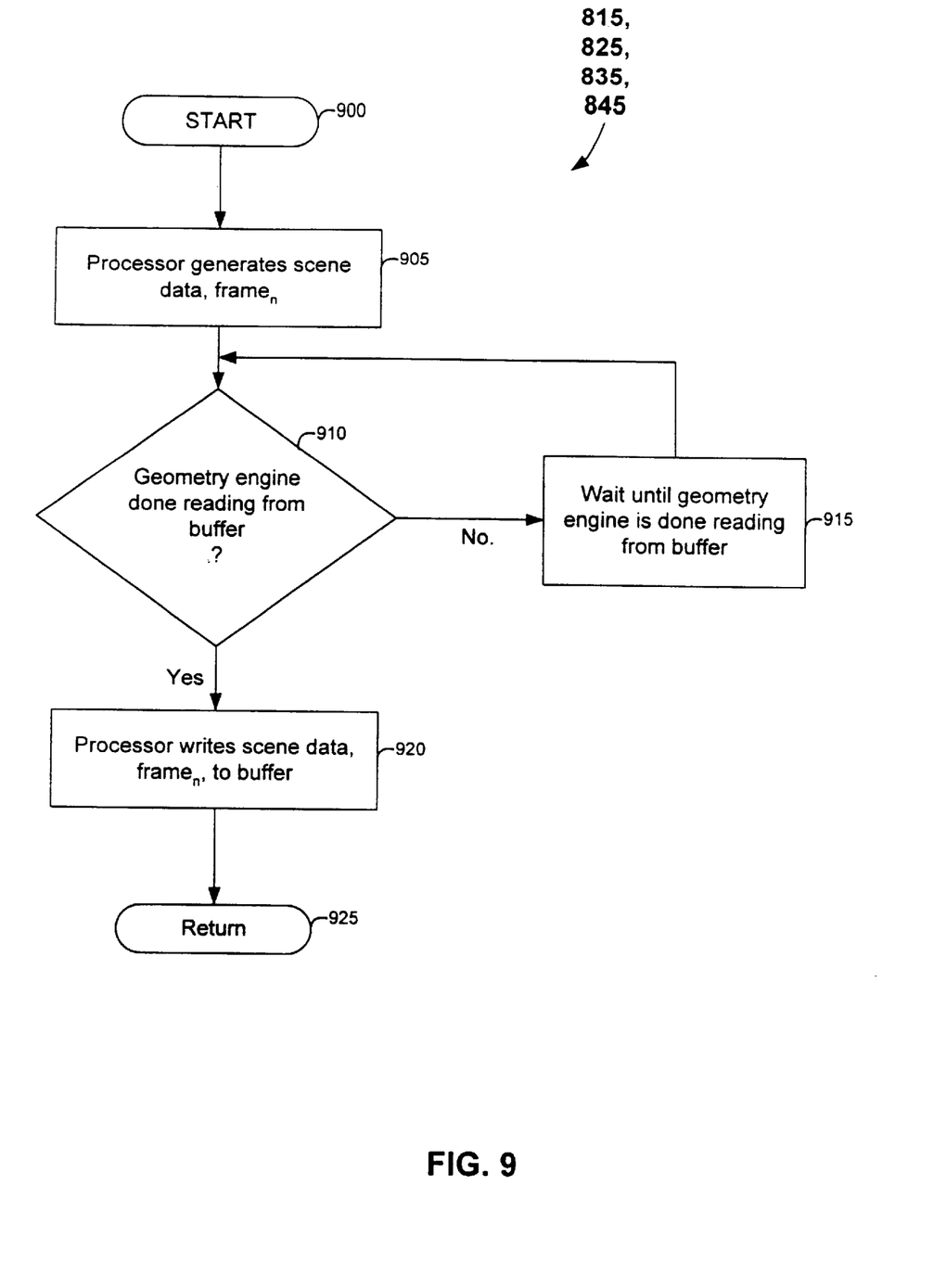
FIG. 9 is a flowchart showing the process of making scene data available to a geometry engine, according to an embodiment of the invention.

The steps in which a processor makes scene data available in memory (steps 815, 825, 835, and 845) are illustrated in greater detail in FIG. 9. The process begins with a step 900. In a step 905, the processor generates scene data for a $frame_n$. In a step 910, a determination is made as to whether the geometry engine is finished reading from the intermediate buffer to which the $frame_n$ scene data is to be written. In an embodiment of the invention, this determination can be made by using a system of flags which are set and reset depending on the status of the geometry engine's read operation. If the geometry engine is not finished reading from this buffer, then, in a step 915, the process must wait until the geometry engine is finished doing so. When and if the geometry engine is finished reading from the buffer, then, in a step 920, the processor proceeds to write the scene data associated with $frame_n$ to the buffer. The process concludes with a step 925.

C. Reading and rendering scene data

Figure 10:
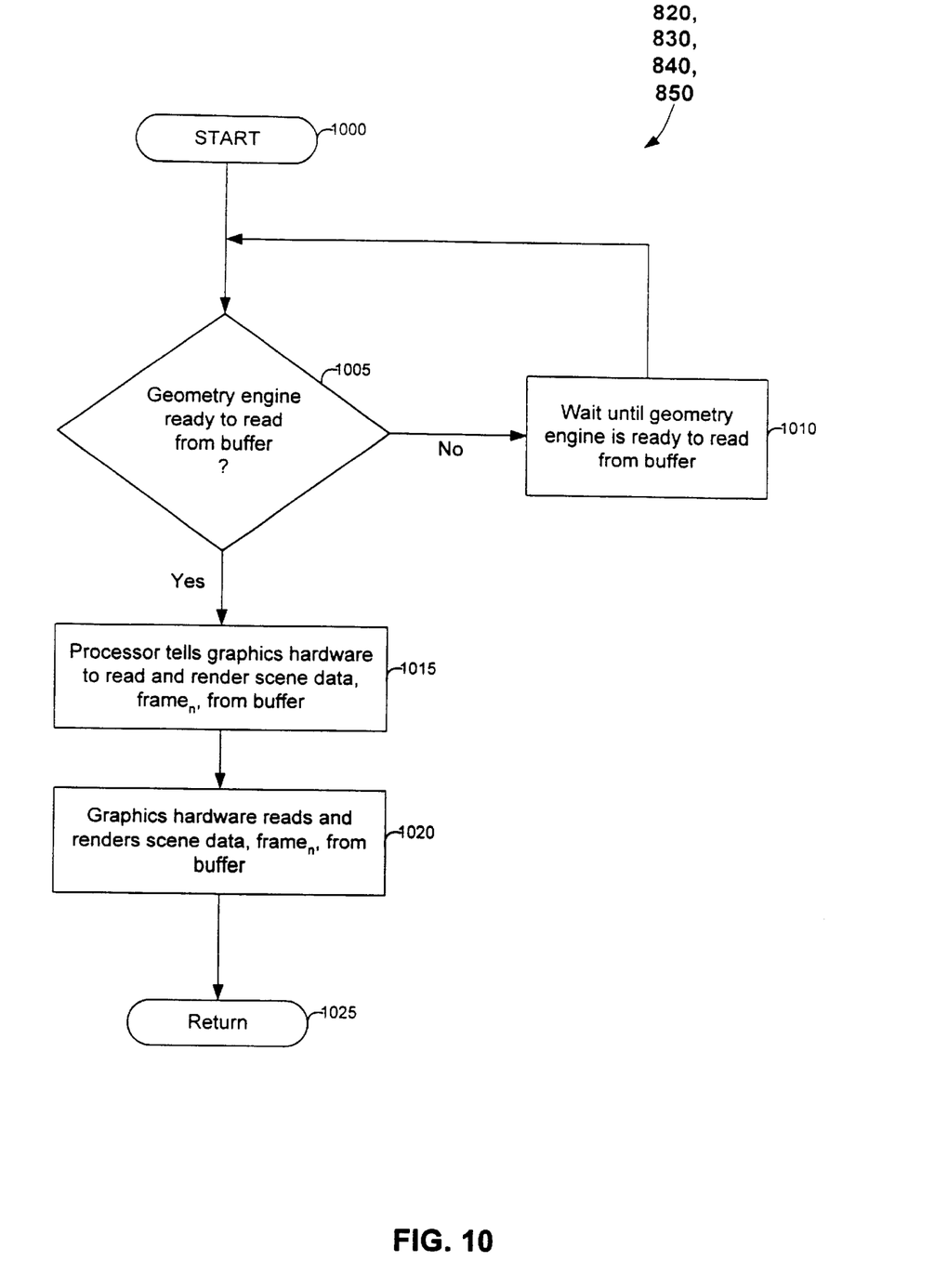
FIG. 10 is a flowchart showing the process of reading and rendering scene data, according to an embodiment of the invention.

The steps in FIG. 8 in which the geometry engine reads and renders scene data (steps 820, 830, 840, and 850) are illustrated in greater detail in FIG. 10. The process starts with a step 1000. In a step 1005, a determination is made as to whether the geometry engine is ready to read scene data from an intermediate buffer. The geometry engine may, for example, still be reading from the another memory location. In this case, the geometry engine is not yet ready to read from the present buffer. Therefore, in a step 1010, the process must wait until the geometry engine is ready to read from the buffer. When and if the geometry engine is ready, in a step 1015, the processor tells the geometry engine to read and begin rendering the scene data associated with $frame_n$. In so doing, the processor specifies the memory address, i.e., buffer location, from which the geometry engine is to read the scene data. In an embodiment of the invention, the determination as to whether the geometry engine is ready to read scene data can be made by using a system of flags which are set and reset depending on the status of the geometry engine's readiness to read. In a step 1020, the geometry engine reads and begins rendering the scene data associated with $frame_n$ from the buffer. The process ends with a step 1025.

D. Multiple threads and context switching

If a state-based application language such as OpenGL® is being used, then at any given point in the rendering of the scene data, a particular context will be in effect. The context of scene data refers to the current value of state variables, such as the current color or current polygon drawing mode, and is defined by the application.

As described above, some embodiments of the invention include a plurality of processors, each executing its own respective application. A given processor may even execute multiple applications if the processor has multi-tasking capability. Because each application has its own sequence of instructions, each application is said to have its own thread. In such an embodiment, a plurality of blocks of scene data are written to an intermediate buffer. The blocks of scene data collectively represent the scene data for a frame. Because each application, or thread, defines its own context, the graphics hardware must be cognizant of the plurality of contexts represented in the plurality of scene data blocks. Moreover, the graphics hardware must be able to handle the necessary context switching as it renders a block of scene data from one application, then moves to another block.

Figure 11:
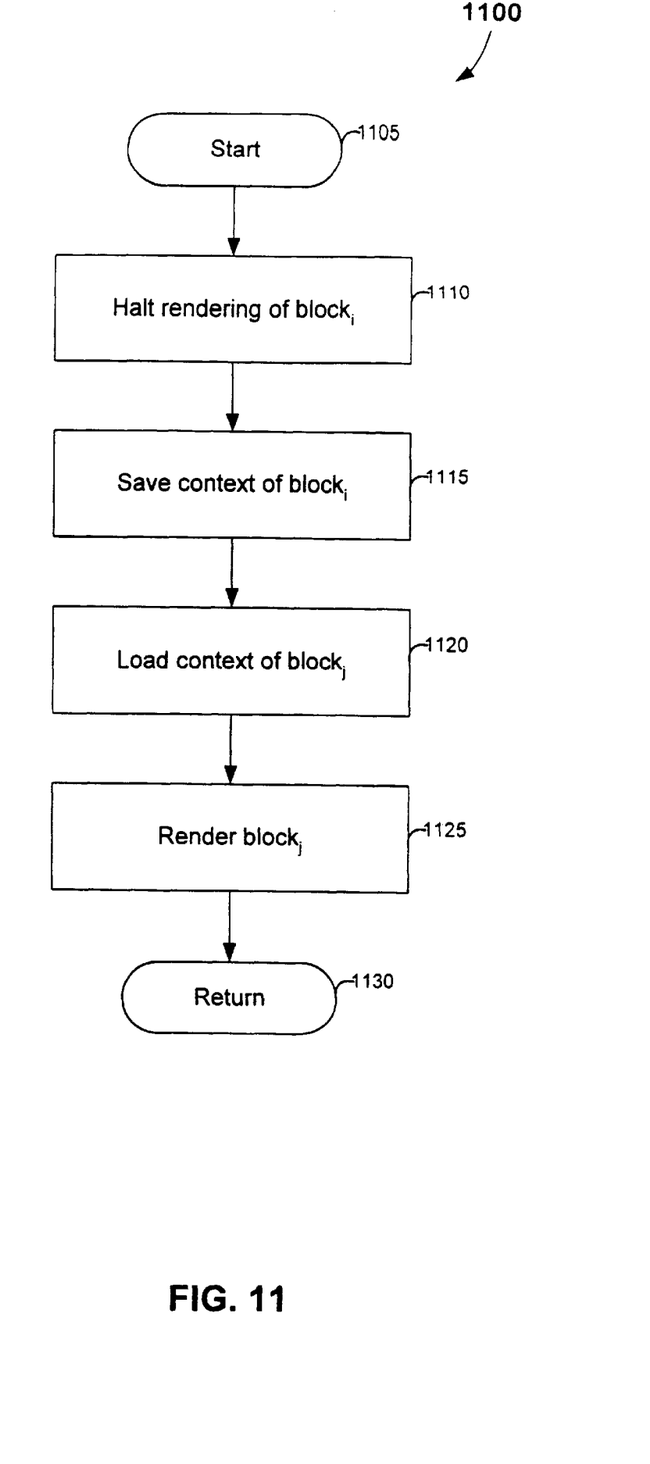
FIG. 11 is a flowchart showing the process of context switching, according to an embodiment of the present invention.

The process of switching contexts, according to an embodiment of the invention, is illustrated in FIG. 11. In the illustrated exemplary scenario, the rendering of a $block_i$ of scene data ends, and the rendering of a $block_j$ begins. $Block_i$ and $block_j$ have been produced by separate processors executing separate applications. As a result, $block_i$ and $block_j$ have potentially different contexts, and the geometry engine must be able to switch contexts. The process begins with a step 1105. In a step 1110, the rendering of $block_i$ is halted. In a step 1115, the context of $block_i$ is saved. In a step 1120, the context of a $block_j$ is loaded. In a step 1125, the rendering of $block_j$ is commenced. The process concludes with a step 1130.

V. Environment

As described above, the present invention operates in the setting of a computer graphics system, and can be implemented in hardware, firmware, or software, or a combination thereof. A more complete illustration of such a system is presented in FIG. 12. After reading this description, it will become apparent to a person skilled in the relevant art how to implement the invention using other computer systems and/or computer architectures.

Figure 12:
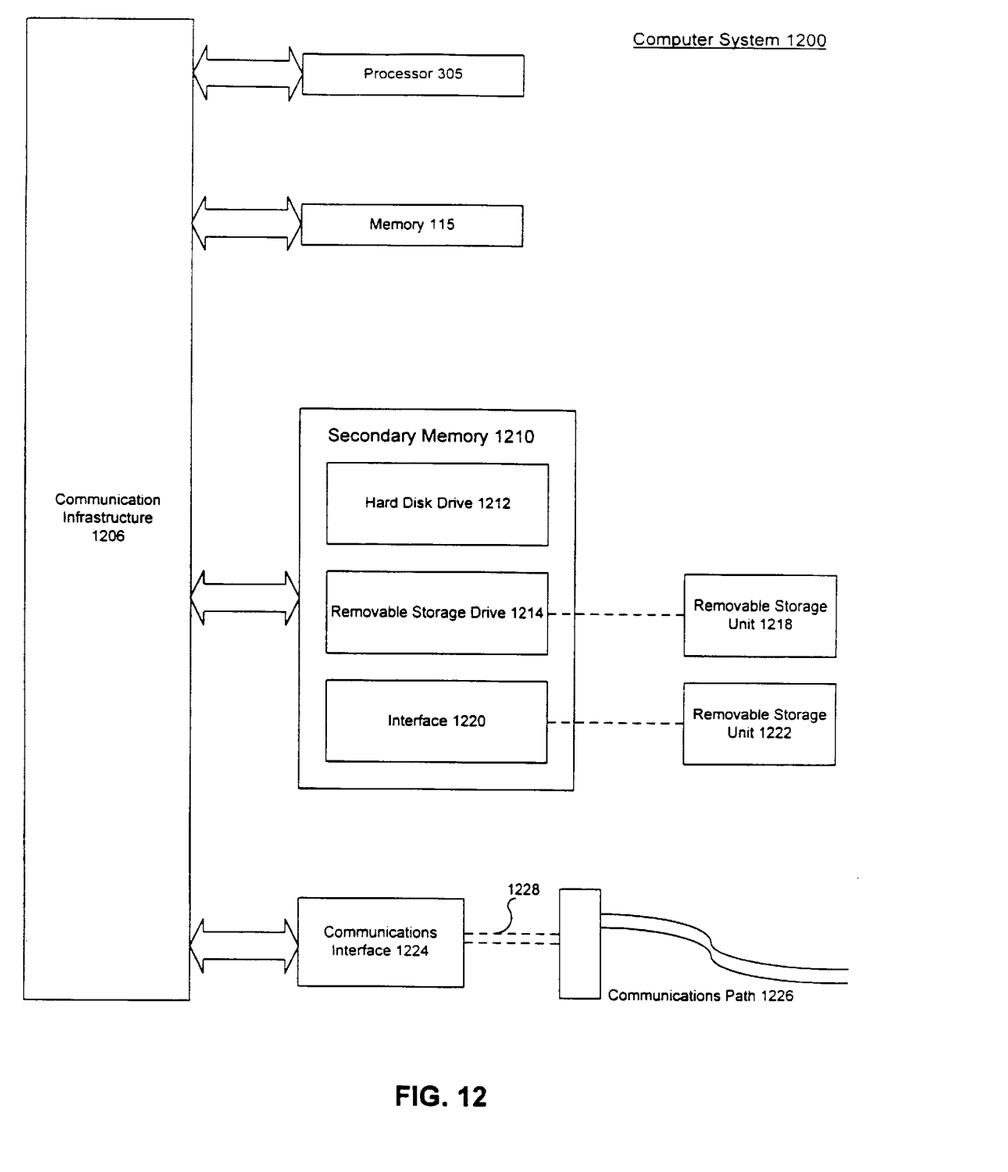
FIG. 12 is a block diagram illustrating the computing environment of the invention.

The computer system 1200 includes one or more processors, such as processor 305. Processor 305 is connected to a communication infrastructure 1206, such as a bus or network. Computer system 1200 also includes memory 115, preferably random access memory (RAM). Processor 305 uses communication infrastructure 1206 to communicate with memory 115. Computer system 1200 may also include a secondary memory 1210. The secondary memory 1210 may include, for example, a hard disk drive 1212 and/or a removable storage drive 1214, representing a floppy disk drive, a magnetic tape drive, an optical disk drive, etc.

The removable storage drive 1214 reads from and/or writes to a removable storage unit 1218 in a well known manner. Removable storage unit 1218 represents a floppy disk, magnetic tape, optical disk, or other storage medium which is read and written to by removable storage drive 1214. As will be appreciated, the removable storage unit 1218 includes a computer usable storage medium having stored therein computer software and/or data.

In alternative implementations, secondary memory 1210 may include other means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

While the embodiment of the invention described above features intermediate buffers implemented in memory 115, intermediate buffers may alternatively be implemented in secondary memory 1210.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCMCIA slot and card, etc. Software and data transferred via communications interface 1224 are in the form of signals 1228 which may be electronic, electromagnetic, optical or other signals capable of being received by communications interface 1224. These signals 1228 are provided to communications interface 1224 via a communications path (i.e., channel) 1226. This channel 1226 carries signals 1228 and may be implemented using wire or cable, fiber optics, a phone line, a cellular phone link, an RF link and other communications channels. In an embodiment of the invention, geometry engine 310 receives instructions from processor 305 via interface 1224 and communications path 1226. In an embodiment of the invention, geometry engine 310 also receives scene data 120 from memory 115 via interface 1224 and communications path 1226.

In this document, the terms "computer program medium" and "computer usable medium" are used to generally refer to media such as removable storage units 1218 and 1222, a hard disk installed in hard disk drive 1212, and signals 1228. These computer program products are means for providing software to computer system 1200.

Computer programs (also called computer control logic) are stored in memory 115 and/or secondary memory 1210. Computer programs may also be received via communications interface 1224. Such computer programs, when executed, enable the computer system 1200 to implement the present invention as discussed herein. In particular, the computer programs, when executed, enable the processor 305 to implement the present invention. Accordingly, such computer programs represent controllers of the computer system 1200. Where the invention is implemented using software, the software may be stored in a computer program product and loaded into computer system 1200 using removable storage drive 1214, hard drive 1212 or communications interface 1224. In an embodiment of the present invention, application program 110 is implemented in software and can therefore be made available to processor 305 through any of these means.

VI. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of sending scene data to a geometry engine, comprising the steps of:

(a) generating first scene data;

(b) writing the first scene data to a first intermediate buffer in system memory;

(c) generating second scene data;

(d) instructing the geometry engine to read the first scene data from the first intermediate buffer;

(e) reading the first scene data from the first intermediate buffer, independent of step (c);

(f) rendering the first scene data, after step (e) and independent of step (c);

(g) writing the second scene data to a second intermediate buffer in system memory;

(h) instructing the geometry engine to read the second scene data from the second intermediate buffer;

(i) reading the second scene data from said second intermediate buffer; and (j) rendering the second scene data.

2. The method of claim 1, wherein steps (e) is performed approximately contemporaneously with steps (c).

3. The method of claim 1, wherein said first scene data comprises pointers to additional first scene data stored in memory, and wherein step (f) further comprises rendering said additional first scene data.

4. The method of claim 1, wherein said second scene data comprises pointers to additional second scene data stored in memory, and wherein step (f) further comprises rendering said additional second scene data.

5. The method of claim 1, wherein steps (a), (b), (c), (d), (g), and (h) are performed by an processor.

6. The method of claim 1, wherein steps (e) and (i) are performed by the geometry engine.

7. The method of claim 1, wherein steps (a) and (b) are each performed by a plurality of processors.

8. The method of claim 7, wherein step (f) comprises the step of context switching.

9. The method of claim 8, wherein the step of context switching comprises the steps of:

A) halting rendering of a block of scene data;

B) saving the context of said block of scene data;

C) loading the context of a next block of scene data; and

D) rendering said next block of scene data.

10. The method of claim 1, wherein steps (c) and (g) are each performed by a plurality of processors.

11. The method of claim 10, wherein step (j) comprises the step of context switching.

12. The method of claim 11, wherein the step of context switching comprises the steps of:

A) halting rendering of a block of scene data;

B) saving the context of said block of scene data;

C) loading the context of a next block of scene data; and

D) rendering said next block of scene data.

13. The method of claim 1, wherein steps (e) and (f) are performed approximately contemporaneously with step (c) and (g).

14. A system for sending scene data, comprising:

at least one processor;

a first memory module and a second memory module;

a geometry engine; and means for rendering first scene data and second scene data;

wherein said at least one processor further comprises:

means for generating said first scene data and said second scene data;

means for writing said first scene data to said first memory module;

means for providing instructions to the geometry engine to read from a specified set of memory addresses;

means for writing second scene data to said second memory module; and means for providing instructions to the geometry engine to read from a second set of memory addresses; and wherein the geometry engine further comprises:

means for receiving said instructions from said at least one processor;

means for reading said first scene data from said memory module; and means for reading said second scene data from said second memory module.

15. The system of claim 14, wherein said scene data comprises pointers to additional scene data stored elsewhere in said memory module.

16. The system of claim 14, wherein said geometry engine comprises means for performing context switching, to control rendering of said scene data read by said geometry engine.

17. A computer program product comprising a computer usable medium having computer readable program code means embodied in said medium for causing an application program to execute on a computer that writes scene data to one of a plurality of intermediate buffers in system memory and instructs a geometry engine to read the scene data from the intermediate buffer, said computer readable program code means comprising:

a) first computer readable program code means for causing the computer to write first scene data for a frame to a first intermediate buffer in system memory;

b) second computer readable program code means for causing the computer to instruct the geometry engine to read the first scene data for said frame from said first intermediate buffer;

c) third computer readable program code means for causing the computer to render the first scene data;

d) fourth computer readable program code means for causing the computer to write second scene data for a frame to a second intermediate buffer in system memory;

e) fifth computer readable program code means for causing the computer to instruct the geometry engine to read the second scene data for said frame from said second intermediate buffer; and f) sixth computer readable program code means for causing the computer to render the second scene data.

18. A method of sending computer graphics scene data to a geometry engine via a processor in a computer system, comprising the steps of:

generating first scene data using the processor;

writing the first scene data to a first intermediate buffer in a system memory;

reading the first scene data from the first intermediate buffer using the geometry engine;

rendering the first scene data using the geometry engine and simultaneously generating second scene data using the processor;

writting the second scene data to a second intermediate buffer in the system memory;

reading the second scene data from the second intermediate buffer using the geometry engine; and rendering the second scene data using the geometry engine.

19. The method according to claim 18, wherein the first scene data comprises a plurality of blocks, wherein each block comprises an associated application context.

20. The method according to claim 19, wherein the first scene data comprises a plurality of application contexts.

21. The method according to claim 20, wherein the step of rendering the first scene data comprises the steps of:

rendering a first block of the first scene data according to the application context of the first block of the first scene data;

halting the rendering of the first block of the first scene data;

saving the application context of the first block of the first scene data;

loading the application context of a second block of the first scene data; and rendering the second block of the first scene data according to the application context of the second block of the first scene data.

22. The method according to claim 18, further comprising the step of setting a flag, via the geometry engine, to indicate to the processor a readiness of the geometry engine to read the second scene data.

23. A system for sending computer graphics scene data to a geometry engine via a processor, comprising:

a system memory comprising a first intermediate buffer and second intermediate buffer;

a processor in communication with the system memory, which is adapted to generate first scene data and to transmit the first scene data to the first intermediate buffer, and to generate second scene data and to transmit the second scene data to the second intermediate buffer; and a geometry engine comprising a first module in a graphics hardware suite and in communication with the processor and the system memory, which is adapted to read and render the first scene data from the first intermediate buffer independent of, and simultaneous with, the processor generating second scene data, and is further adapted to read and render the second scene data from the second intermediate buffer.

24. The system of claim 23, wherein the first scene data comprises a plurality of blocks and each block comprises an associated application context.

25. The system of claim 24, wherein the geometry engine is further adapted to render a first block of the first scene data according to the application context of the first block of the first scene data, halt the rendering of the first block of the first scene data and save the application context of the first block of the first scene data, load the application context of a second block of the first scene data, and render the second block of the first scene data according to the application context of the second block of the first scene data.

26. The system of claim 23, wherein the geometry engine is further adapted to set a flag for indicating to the processor a readiness to read the second scene data.

27. A computer-readable medium having computer-executable instructions for performing a method of sending computer graphics scene data to a geometry engine via a processor in a computer system, the method comprising the steps of:

generating first scene data using the prosessor;

writting the first scene data to a first intermediate buffer in a system memory;

reading the first scene data from the first intermediate buffer using the geometry engine;

rendering the first scene data using the geometry engine and simultaneously generating second scene data using the processor;

writting the second scene data to a second intermediate buffer in the system memory;

reading the second scene data from the second intermediate buffer using the geometry engine; and rendering the second scene data using the geomety engine.

28. The computer-readable medium according to claim 27, wherein the first scene data comprises a plurality of blocks, wherein each block comprises an associated application context.

29. The computer-readable medium according to claim 28, wherein the first scene data comprises a plurality of application contexts.

30. The computer-readable medium according to claim 29, wherein the step of rendering the first scene data comprises the steps of:

rendering a first block of the first scene data according to the application context of the first block of the first scene data;

halting the rendering of the first block of the first scene data;

saving the application context of the first block of the first scene data;

loading the application context of a second block of the first scene data; and rendering the second block of the first scene data according to the application context of the second block of the first scene data.

31. The computer-readable medium according to claim 27, further comprising computer-executable instructions for setting a flag, via the geometry engine, to indicate to the processor a readiness of the geometry engine to read the second scene data.

* * * * *